INVENTOR.
Lee E. Elfes
BY
Carlson, Pitzner, Hubbard & Wolfe
Attorneys

Nov. 12, 1957 L. E. ELFES 2,812,630
AUXILIARY SUPPORTING MEANS FOR TRACTOR MOUNTED MOWER
Filed June 23, 1954 2 Sheets-Sheet 2

INVENTOR.
Lee E. Elfes
BY Carlson, Pitzner,
Hubbard & Wolfe
Attorneys

United States Patent Office 2,812,630
Patented Nov. 12, 1957

2,812,630

AUXILIARY SUPPORTING MEANS FOR TRACTOR MOUNTED MOWER

Lee E. Elfes, Birmingham, Mich., assignor to Massey-Harris-Ferguson, Inc., a corporation of Maryland Application June 23, 1954, Serial No. 438,666

5 Claims. (Cl. 56—25)

The present invention relates to mowing machines and more particularly to rear mounted mowers for use on tractors.

It is an object of the present invention to provide a novel gauge arrangement for a mower for determining mower height when the mower is used for rough or corrugated terrain. More particularly, it is an object to provide a mower gauge arrangement for use in a field which has been corrugated for irrigation or anti-erosion purposes which prevents the mower from dropping into a furrow and which serves to maintain the mower bar at a height determined by the elevation of the spaced ridges regardless of the direction of relative movement of the tractor.

It is another object to provide a gauge arrangement for a mower having a tilt adjustment for tilting the mower bar and in which the gauge is readily adjustable either to adjust the riding height above the ground or to compensate for changes in the tilt of the mower bar. It is a related object to provide a gauge in the form of a caster wheel which is so mounted and arranged that the caster pivot axis is automatically maintained in a desired angular position for optimum castering throughout the entire range of height adjustment. More particularly stated, it is an object to provide a caster wheel gauge for a mower which is supportingly connected to an adjustable drag bar and in which the caster pivot axis is maintained vertical for all adjusted positions of the drag bar.

It is a further object of the invention to provide a caster wheel arrangement which serves as an effective support for the associated mower but which occupies an out-of-the-way position permitting full castering without interference with surrounding mower structure.

In one of the aspects of the invention it is an object to provide a mower caster wheel which is not only capable of adjustment about an axis extending transversely of the tractor but which is adjustable about a longitudinal axis to compensate for changes in downward angling of the drag bar.

It is a general object to provide an improved mower attachment which is easy to operate, making it unnecessary for the driver to watch out for irregularities or corrugations and making it possible for even an unskilled operator to do a fast and satisfactory job. It is yet another object to provide an improved mower attachment which reduces the possibilities of damage for example due to "digging in" when operating on rough ground.

Finally, it is an object to provide a caster wheel arrangement which is not only capable of adjustment for all possible working conditions but which is simple and straightforward and sufficiently durable even in the face of hard usage, to outlast the rest of the mower construction.

Other objects and advantages of the invention will be apparent upon reading the following detailed description and upon reference to the drawings in which.

While the invention has been shown and will be described herein in connection with a preferred form of the invention, it will be understood that the detailed disclosure is simply exemplary and that I do not intend to limit the invention thereto but intend to cover all modifications and alternative constructions and uses falling within the spirit and scope of the invention as expressed in the appended claims.

Figure 1:
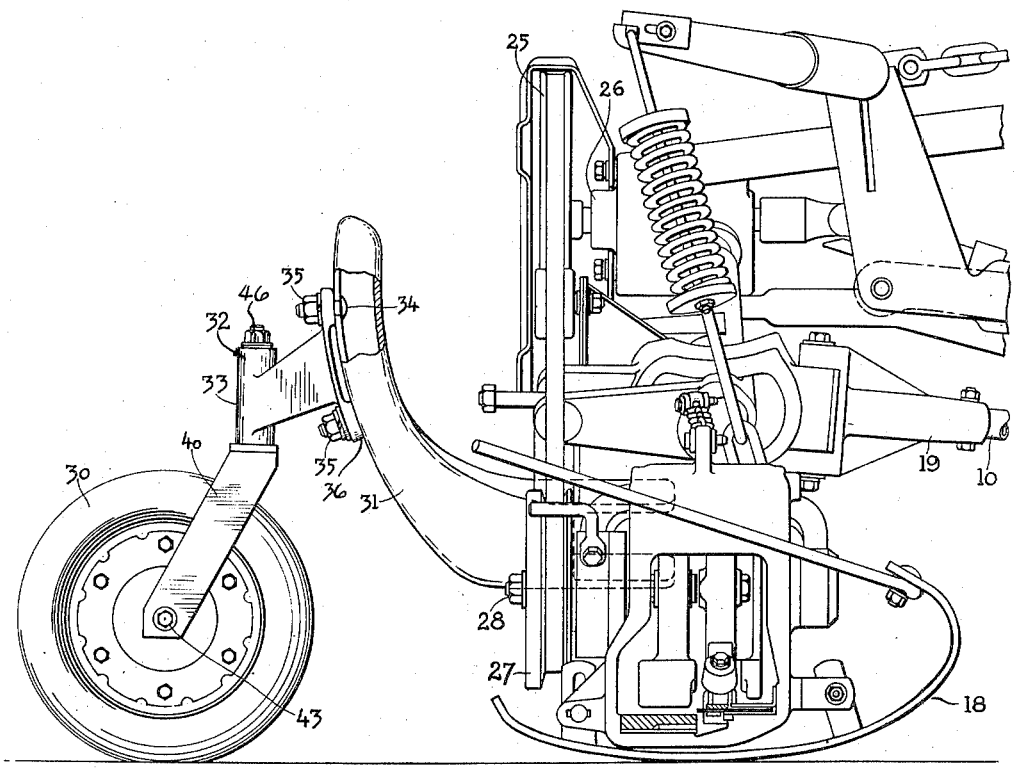
Figure 1 is a side elevation, with parts broken away and shown in section, of a mower height gauge constructed in accordance with the present invention and applied to a rear mounted tractor mower.

The present invention is an improvement in the structure shown in my prior application Serial No. 305,635, filed August 21, 1952, now Patent 2,743,568, and entitled "Mower Attachment for Tractors." Such prior application describes the mower attachment in detail including the operating mechanism, the means for coupling the mower attachment to the tractor, and the means for adjusting the angle of tilt of the mower bar relative to the surface of the ground. Referring to the drawings appended hereto, the attachment includes a frame 10 which is pivotally connected to the rear end of a tractor. Extending laterally and downwardly from the frame 10 is a drag bar 11. The drag bar has a ball and socket connection 12 with the frame at its upper end, while at its lower end the drag bar is bifurcated as shown at 13 defining a horizontal pivot axis 14. Pivoted to the lower end of the drag bar is a mower bar 15 having a driving head 16 which serves to drive a set of cutters 17. Arranged directly below the driving head 16 for supporting the inner end of the mower bar on the ground is a shoe 18 which may be arcuately shaped as shown in Fig. 1. To resist ground reaction the drag bar is connected to a forwardly extending pull bar 19 having a point of anchoring to the tractor (not shown).

For the purpose of lifting the mower bar 15 and drag bar 11 clear of the ground, a lift bar 20 is provided having a spring suspension 21 which is connected at its lower end to the driving head 16. However, during normal use, no upward tension is applied to the lift bar and the mower attachment rides along supported on the surface of the ground. In order to oscillate the cutters 17 on the mower bar, a belted connection is provided from the tractor power take-off. This conection includes an upper driving pulley 25 which is supported in a bearing housing 26 and a lower pulley 27 which is journaled, as shown, in the driving head 16, the two pulleys being interconnected by a belt 28. Upon movement of the belt, the rotary motion is converted to reciprocating motion in the driving head so that the cutters 17 are vibrated in the usual manner.

In the above brief description, mention has simply been made of the primary features of construction and a more detailed understanding may be had by referring to my prior patent application, the entire disclosure of which is incorporated herein by reference.

In accordance with the present invention, a height gauge is provided in the form of a caster wheel 30 rigidly coupled to the drag bar 11 and so arranged that it engages the ground inwardly and rearwardly from the shoe 18. In the present instance the caster wheel 30 is mounted on a yoke 31 which is rigidly clamped to the lower end of the drag bar by means of bolts 32'. Extending inwardly and rearwardly from the yoke 31 is a rigid caster wheel bracket 32 having a vertical sleeve 33 and mounting pad 36, the bracket being connected to the yoke by means of bolts and nuts 34, 35.

For mounting the caster wheel 30, a fork 40 is provided having opposite sides 41, 42 spanned at their lower ends by the wheel axle 43. At its upper end, the fork 40 includes cross members 45 mounting a vertical spindle 46 which is received in the vertical sleeve 33. Briefly summarizing the above structure, the yoke 31 and bracket 32, rigidly coupled to the drag bar 11, mount the caster wheel 30 for free pivoting movement rearwardly of the regular mower structure, the caster wheel 30 being free to swivel to accommodate itself to the direction of movement of the tractor while helping to support the mower structure on the ground.

Figure 3:
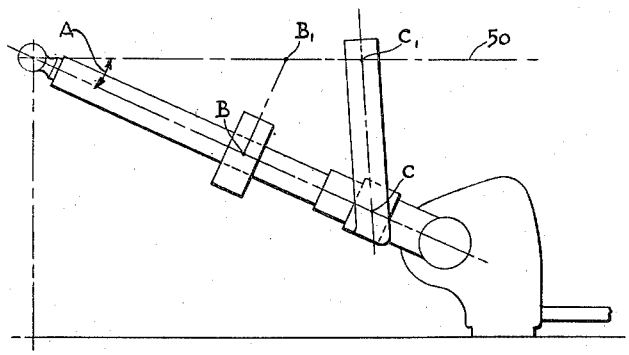
Fig. 3 is a diagram showing the geometry of the mower of Figs. 1 and 2 as viewed from the rear.
Figure 4:
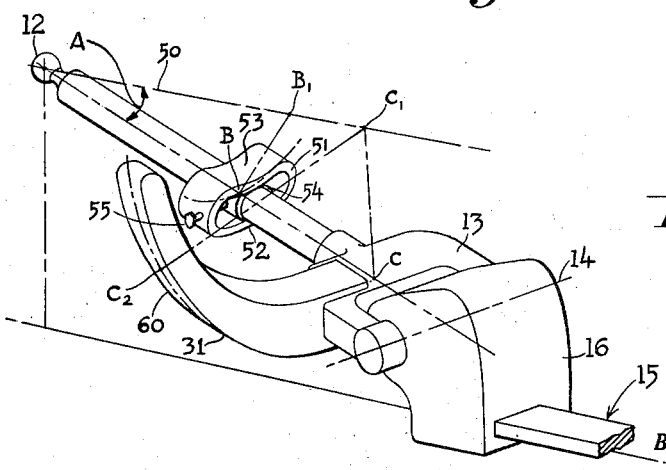
Fig. 4 is a diagram showing the mower geometry in perspective.

Prior to discussing the advantages of such an arrangement, more detailed reference will be made to the structure and arrangement of the yoke 31, particular reference being made to the diagram in Fig. 4. As more fully described in the above-mentioned patent application, the mower structure includes means for changing the angle of tilt of the mower bar 15 which permits the blades to be oriented either parallel to the surface of the ground or tilted upwardly or downwardly at a slight angle. In order to permit such tilt adjustment while maintaining the mower bar 15 in its "straight out" position, i. e., at substantially right angles to the direction of normal moving movement means are provided for guiding the drag bar 11 about a conical path or locus centered about a horizontal axis which extends through the ball and socket joint 12 at the upper end of the drag bar. Such axis, indicated at 50 in Figs. 3 and 4 may be conveniently referred to as the drag bar swing axis. To guide the drag bar 11 about a portion of a conical locus in the present instance, a guide member 51 is provided having a pair of opposed arcuate walls 52, 53. Received between the walls 52, 53 is a follower block or slider 54 which forms an integral enlargement on the drag bar. The position of the drag bar in the guide member is adjusted by means of an adjusting bolt 55 which is held captive in the end wall of the guide member and which threadedly engages the slider 54 and drag bar 11. For the details of construction of this adjustment as well as the details of construction of the guide member and slider block, reference is made to the above-mentioned prior application.

For present purposes, it will be sufficient to note that forward swinging movement of the drag bar 11 about the swing axis 50 is accompanied by slight counter-clockwise rotation of the drag bar about its own axis. The combination of such movements produces forward broadwise movement of the cutter bar about the locus of a cylinder centered on the axis 50 causing the teeth of the mower bar to be tilted upwardly while leaving the orientation of the mower bar relative to the tractor unaffected. Conversely, swinging the drag bar 11 rearwardly within the guide member imparts a slight clockwise movement to the drag bar about its own axis and this combined with the rearward swing causes the mower teeth to be tilted downwardly toward the ground. In each instance, the adjustment is conveniently made by turning the bolt 55 with any suitable tool.

Figure 2:
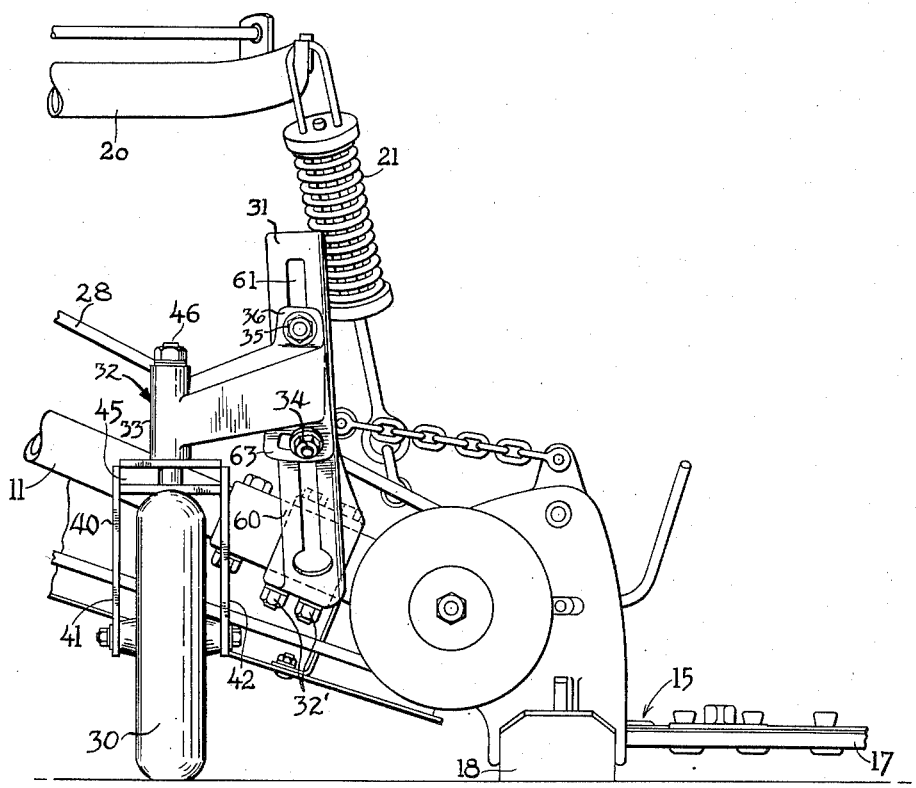
Fig. 2 is a rear elevation corresponding to Fig. 1.

In accordance with one of the aspects of the invention, the yoke 31 is arcuately shaped having a rear mounting surface 60 centered about the drag bar swing axis 50 previously referred to. In order to enable the bracket 32 to be mounted at any point along the arcuate surface 60, the bolts 34 which anchor the bracket member 32 are slidable in a longitudinal slot 61 centrally formed on the mounting surface 60. It will be apparent that the bracket 32 may be adjusted over a wide range of arcuate movement simply by loosening the nuts 35 and sliding the bracket to a new position along the yoke 31, after which the nuts may be tightened. The bracket 32, fork 40, and the radius of the caster wheel 30 are such that the caster axis is vertical when the caster wheel 30 and shoe 18 are both in riding contact with level ground (Fig. 2).

Given the teachings of the present invention, the latter is a condition which is readily met by one skilled in the art.

With the mounting surface 60 on the yoke 31 centered about the swing axis 50, it is found that the caster axis remains vertical over the entire range of tilt adjustment. This may be readily seen by considering a practical case in which it is desired to tilt the cutter bar downwardly. To do this, the slider 54 is moved backwardly in the guide member 51 by means of the bolt 55, causing bodily rotation of the drag bar about its own axis and about the swing axis 50 and lifting the caster wheel 30 clear of the ground. In order to restore the caster wheel to normal working position, the nuts 35 are unscrewed, permitting the caster wheel and bracket to drop under their own weight to a new position along the mounting surface 60 at which the nuts are screwed tight. The change of height adjustment is accompanied by an automatic change in the angle of the bracket 32 relative to the yoke 31 restoring the caster axis to the vertical condition.

The same holds true upon tilting the mower bar upwardly, and since the caster axis is maintained vertical at all times, castering remains optimum without special adjustment or attention on the part of the tractor operator.

When employing the mower on ground which is perfectly flat, both the castered gauge wheel 30 and the shoe 18 serve to support the weight of the mower. The arrangement described therein is, however, particularly and uniquely suited for use in fields which have been corrugated for irrigation or to prevent erosion of light soil formed of volcanic ash or the like. In a typical case, the corrugations may be four to seven inches deep, 13 inches in width, and spaced on 30 inch centers. Such corrugations normally follow contour lines; it is not practical, however, for the tractor to follow the curved contour path. Under typical conditions, therefore, the mower cuts across the corrugations at an indefinite angle which may be either shallow or obtuse. It is found when using the present device over a wide variety of conditions, that either the shoe 18 or the caster wheel 30 is in contact with a ridge for supporting the mower structure at the desired cutting height. This effectively prevents the shoe 18 from dropping into a trough and thus prevents the mower bar from damaging itself by digging into the ground. In short, as the mower passes across the field, the mower structure will be alternately supported by the shoe 18 and by the caster wheel 30, and sometimes by a combination of the two of them. This makes it possible for the tractor operator to give his full attention to cutting a straight swath and no thought need be given to the direction of corrugations nor to the tractor's relation to the corrugations. The practical effect is that even an unskilled operator is capable of doing a fast and satisfactory mowing job with minimum risk or damage to the mower. The same advantages may be obtained in non-corrugated fields where surface conditions are extremely rough.

One of the more detailed features of the present invention is that the bracket 32 is offset inwardly from the point of attachment to the drag bar 11. This not only increases the lateral spacing between the shoe 18 and the caster wheel 30, but insures more equal division of load between the shoe and the wheel. The importance of this may be seen by considering the effect of fastening the yoke adjacent the ball and socket joint at the upper end of the drag bar and assuming that the caster wheel 30 has been adjusted a little bit too "low." Under such conditions, the length of the drag bar would serve as a force multiplier tending to cause the relatively narrow caster wheel to be excessively loaded, a condition which is to be avoided, especially on soft ground.

In all of the possible conditions of adjustment of the caster wheel, it will be noted that it occupies an out-of-the-way position well to the rear of the mower structure, enabling the wheel to rotate about the caster axis through a large angle, almost 360°, without interfering with any of the mower structure.

While the invention has been described above in connection with a drag bar 11 having a particular slant angle, it is one of the features of the present invention that the caster wheel may be bodily rotated about an axis which extends longitudinally of the tractor so that the caster axis may be maintained vertical for various amounts of drag bar slant. For example, where the tractor rear wheels are adjusted for a wide tread, the angle indicated at "A" in Fig. 4 may be approximately 22° and where the tractor is adjusted for a narrow tread, the angle may be on the order of 30°. Accommodation for change of angle is provided in the present structure by a transverse slot 63 (Fig. 2) for receiving the lowermost of the two bolts 34. The slot 63, while relatively short, is arcuately shaped, centering about the upper bolt 34. It is a simple matter to provide proper adjustment at the slot 63 simply by viewing the caster axis from the rear and by twisting the bracket 32 slightly just prior to tightening the nuts 35 which hold the bracket in place on the yoke 31.

The hollow boxlike construction of the yoke 31 illustrated in the drawings results in a high degree of rigidity and strength, enabling the yoke to resist bending under the most severe field conditions. The construction is not only durable but straightforward and inexpensive and may be expected to outlast the remaining parts of the mower. The caster wheel assembly may, if desired, be attached to a mower not previously equipped, the yoke 31 being fastened in place by screwing tight the bolts 32 at the lower end.

I claim as my invention:

1. In a mower attachment for a tractor, the combination comprising a frame, a drag bar extending outwardly and downwardly from the frame and having a universal pivoted connection therewith at its upper end, a laterally extending mower bar pivoted to the outer end of said drag bar, means including an arcuate guide member carried by said frame for guiding the drag bar over a path of adjustment defining a drag bar swing axis and enabling the mower bar to be tilted upwardly and downwardly while maintaining constant orientation between the mower bar and the direction of mowing movement of the frame, a caster wheel having an offset caster spindle, means including a bracket for vertically journalling the caster spindle, and a bracket supporting member rigidly secured to the drag bar, said bracket being adjustable on said support member and said support member being so constructed and arranged that the bracket and caster wheel are rotated bodily about the drag bar swing axis incident to adjustment of the bracket relative to said member so that the caster spindle is maintained vertical in all adjusted positions of the drag bar.

2. In a mower attachment for a tractor, the combination comprising a frame, a drag bar extending outwardly and downwardly from the frame, adjustable means for angularly positioning the drag bar, a laterally extending mower bar pivoted to the outer end of the drag bar, said mower bar having a ground engaging shoe at the point of pivoted connection with the drag bar, a yoke rigidly secured to said drag bar, a caster wheel having an offset spindle defining a caster axis, and means including a caster wheel bracket rigidly fastened to said yoke and engaging said spindle so that the caster wheel is positioned inwardly and rearwardly from the ground engaging shoe, said caster wheel bracket being adjustable with respect to the yoke to maintain the caster wheel in the same vertical relation to said shoe for all positions of angular adjustment of the drag bar said yoke and said bracket being constructed and arranged to maintain the caster axis substantially vertical in all adjusted positions of the bracket.

3. In a mower attachment for a tractor, the combination comprising a frame, a drag bar extending outwardly and downwardly from the frame and having a universal pivoted connection therewith at its upper end, a laterally extending mower bar pivoted to the outer end of said drag bar, means including an arcuate guide member carried by said frame and cooperating with the drag bar to guide it in a path of adjustment defining a conical locus and enabling the mower blades to be tilted upwardly and downwardly while maintaining constant orientation between the mower bar and the direction of mowing movement of the frame, a caster wheel, means including a bracket for mounting the caster wheel with the castering axis vertical, and a yoke rigidly mounted on said drag bar and having a mounting surface for seating said bracket, means for securing said bracket to said yoke at selected positions along said surface, said mounting surface being substantially coaxial with said conical locus so as to position said castering axis substantially vertical when said bracket is secured in any selected position along said mounting surface.

4. In a mower attachment for a tractor, the combination comprising a frame, a drag bar extending outwardly and downwardly from the frame and having a universal pivoted connection therewith at its upper end, a laterally extending mower bar pivoted to the outer end of said drag bar, means including an arcuate guide member for guiding the drag bar over a path of adjustment defining a conical locus and enabling the mower blades to be tilted upwardly and downwardly while maintaining constant orientation between the mower bar and the direction of mowing movement of the frame, a caster wheel supporting fork having a spindle, means including a bracket for mounting said spindle for pivotal movement, and a yoke rigidly mounted on said drag bar and having a bracket mounting surface disposed to locate the bracket with the spindle axis vertical, said bracket being connected to the yoke by vertically spaced threaded means and said yoke having a vertical slot for permitting relative sliding adjustment of the bracket on the yoke said mounting surface being substantially coaxial with the conical locus so that the spindle axis is maintained vertical under all conditions of adjustment of said bracket.

5. In a mower attachment for a tractor, the combination comprising a frame, a drag bar extending outwardly and downwardly relative to the frame, said drag bar having a universal pivot connection with said frame at its upper end, a laterally extending mower bar pivoted to said drag bar at its lower end and extending horizontally with respect to the ground, means including an arcuate guide member for guiding said drag bar through a range of movement defining a conical locus in which the mower bar is tilted upwardly and downwardly without changing its orientation relative to the direction of mowing movement of the frame, an arcuate yoke member clamped rigidly to the drag bar at its lower end and providing an arcuate mounting surface which curves rearwardly and upwardly from the drag bar, a caster wheel, a bracket supporting said caster wheel for pivotal movement, said caster wheel bracket having a mounting pad for seating on the arcuate mounting surface of said yoke member, said yoke member having clamping means providing relative vertical adjustment between said bracket and said yoke member, said arcuate mounting surface on said yoke member being substantially coaxial with the path of adjustment of said drag member so as to maintain the pivotal axis of the caster wheel substantially vertical in all adjusted positions of said bracket.

(References on following page)

References Cited in the file of this patent

UNITED STATES PATENTS

| | | |
|---|---|---|
| 1,570,415 | Sumbulian | Jan. 19, 1926 |
| 2,136,834 | Baird | Nov. 15, 1938 |
| 2,176,992 | Crumb et al. | Oct. 24, 1939 |
| 2,245,451 | Simpson | June 10, 1941 |
| 2,318,202 | Colvin et al. | May 4, 1943 |
| 2,387,070 | Hilblom | Oct. 16, 1945 |
| 2,533,804 | Hitchcock | Dec. 12, 1950 |
| 2,580,265 | Abgarian | Dec. 25, 1951 |
| 2,663,134 | Bodine | Dec. 22, 1953 |
| 2,743,568 | Elfes | May 1, 1956 |